I. C. & C. F. WILLIAMS.
SEPARATOR FOR STORAGE BATTERIES.
APPLICATION FILED FEB. 21, 1917.
1,265,284.
Patented May 7, 1918.
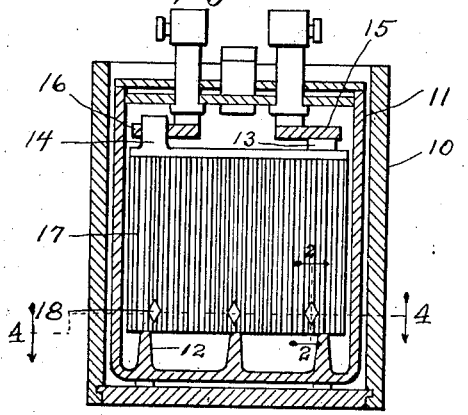
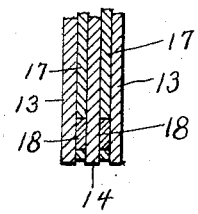
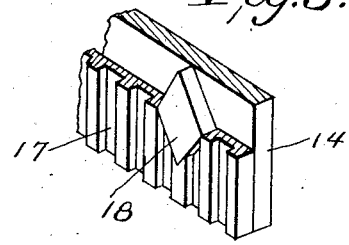
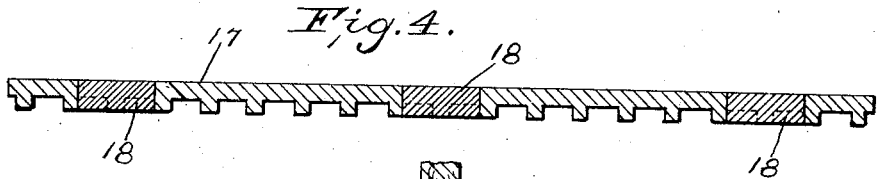
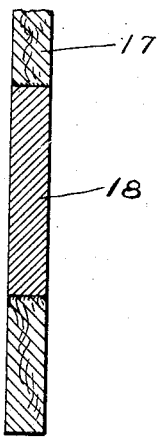
Inventors
Ira C. Williams
and
Chas. F. Williams
By Lockwood & Lockwood
Attorneys

UNITED STATES PATENT OFFICE.

IRA C. WILLIAMS AND CHARLES F. WILLIAMS, OF MUNCIE, INDIANA, ASSIGNORS TO NATIONAL CARBON COMPANY, INC., A CORPORATION OF NEW YORK.

SEPARATOR FOR STORAGE BATTERIES.

1,265,284.   Specification of Letters Patent.   Patented May 7, 1918.

Application filed February 21, 1917. Serial No. 150,144.

*To all whom it may concern:*

Be it known that we, IRA C. WILLIAMS and CHARLES F. WILLIAMS, citizens of the United States, and residents of Muncie, county of Delaware, and State of Indiana, have invented a certain new and useful Separator for Storage Batteries; and we do hereby declare that the following is a full, clear, and exact description thereof, reference being had to the accompanying drawings, in which like numerals refer to like parts.

This invention relates to the construction of storage batteries and more especially to the means for separating the negative and positive plates from each other.

The common type of construction such as is used in storage batteries now on the market is a wood fiber separator which is inserted between the positive and negative plates to prevent their making contact with each other which would produce a short circuit and also to absorb and distribute the acid over the surface of the plates. The separator is commonly made of wood fiber and is very thin and corrugated. As a result of this construction when the batteries become over-charged or heated the plates will warp and mash the wood pulp so that the edges are worn away and eventually the plates will come in contact with each other, thereby causing a short circuit and destroying the life of the battery. On the other hand, the wood pulp will in time disintegrate or wear away so that the plates will be free to make contact with each other which will produce the same results.

The object of this invention is to overcome the difficulty encountered in the above construction and give the batteries a much longer life by providing a means for separating the plates which will be impervious to the acid and wear of the batteries so that the plates will at all times be separated. This is accomplished by pressing a hard acid proof material into the wood fiber at intervals so as to strengthen and protect it from the plates. Or it may be accomplished by clamping the separator on to the bottom end of every other plate so as to protect said plate from the adjacent plate as will be hereinafter shown and described. This construction will at all times prevent the plates from coming into contact with each other and causing a short circuit.

The full nature of the invention will be understood from the accompanying drawings and the following description and claims:

Figure 1 is a vertical cross section through a storage battery showing a separator in front elevation. Fig. 2 is a cross section on the line 2—2 of Fig. 1, showing only three plates and two separators. Fig. 3 is an enlarged view of a portion of a separator and plate. Fig. 4 is an enlarged sectional view on line 4—4 of Fig. 1. Fig. 5 is an enlarged vertical section through a single separator on the line 5—5 of Fig. 4.

In the drawings there is shown a battery box 10 which contains a cell 11 which is filled with acid not shown. Projecting upwardly from the bottom of the cell there are a plurality of flanges 12 on which the negative plates 13 and positive plates 14 rest. Connecting the negative plates 13 with each other there is a connecting strap 15, and the connecting strap 16 connects the positive plates 14 to each other. So much of the construction as has been described is that ordinarily used in the forming of storage cells.

Between each pair of plates there is inserted a separator 17, which is corrugated on one side as shown in Fig. 3. This separator is generally formed of wood pulp which will insulate the plates from each other and also absorb the acid and cause it to attack the full surface of the plates. To prevent the plates mashing these wooden pulp separators when they warp from an over-charge or over heating so as to come in contact with each other and shorten the circuit to the battery, there is provided a plurality of rigid acid resisting separating blocks 18. The blocks 18 are preferably formed of a hard substance such as celluloid, which will be a non-conductor of electricity and resists the action of the acid. The blocks are inserted or pressed into the wood fiber separators preferably across the bottom thereof, or at any other place in the separator where there is danger of the plates coming into contact with each other. These blocks form a permanent separator or wedge between the plates and make it impossible for them to engage or make contact with each other after the separators 17 are partly destroyed by acid, while the material used in the blocks will out-last the possible life of the battery.

It is preferable that the separator 17 be cut away at the point at which the separating block 118 is inserted so as not to bulge or crowd the plate. This type of separating block is preferably used in repairing old plates which have the ordinary type of separator.

It will be understood that this invention is not limited to the special material suggested in the specification, nor to the specific shape shown in the drawings, but any suitable material may be used and in any form which would be applicable for the purpose specified.

The main portion is made of wood or like material which is relatively soft and may be distorted or cut by pressure or chafing, and hard and comparatively indestructible blocks are designed to relieve the main portion, insuring much longer life without greatly reducing the greatly desired porosity.

The invention claimed is:

1. A separator for storage battery electrodes, comprising a porous body adapted to be supported between said electrodes, with its opposite faces in contact therewith, and transverse acid resisting means within the side planes of said porous body for protecting it against destructive compressing action of adjacent electrodes.

2. A separator for storage battery electrodes, comprising a plate of porous material such as wood, adapted to be supported between said electrodes, with its opposite faces in contact therewith, and a plurality of relatively hard acid resisting blocks secured in said plate and having their ends substantially flush with the contacting faces thereof.

3. A separator for storage batteries, which separator consists of a main portion of material having sufficient porosity to permit diffusion of electrolyte, and relatively hard, non-porous and acid resisting blocks secured in and extending through said main portion and flush with the surface thereof.

4. A separator for batteries which separator consists of a main portion having openings therein, and blocks secured in said openings flush with the surface of the main portion, said blocks being made of material more acid resisting than the material forming said main portion.

5. A separator for batteries, which separator consists of a main portion made of material which is relatively not acid-resisting and having openings therethrough, and individual blocks, each made of a single piece of acid-resisting material of the same dimensions throughout the thickness thereof secured in said openings.

6. A separator for batteries, which separator consists of a main portion made of material which is relatively not acid-resisting and having openings therethrough, and individual blocks of acid-resisting material pressed in said openings so as to be secured therein by friction between the blocks and the main portion.

7. Means for separating the positive and negative plates of a storage cell, which separating means consists of a plate like separator adapted to be located between the plates of the cell and to permit acid to pass through it, and blocks made of acid resisting and insulating material entering in openings in said separator and extending substantially from face to face of said separator and of the same thickness as said separator so as to separate said plates.

8. Means for separating the positive and negative plates of a storage cell, which separating means consists of a plate-like separator adapted to be located between the plates of the cell and to permit acid to pass through it, and a plurality of blocks inserted in openings in said separator and extending through said separator from face to face thereof and of the same thickness as said separator, and made of acid resisting and insulating material for permanently separating said plates.

9. A storage cell having a plurality of positive and negative plates therein, a separator between each pair of said plates formed of material which will permit the acid to penetrate the same, and blocks inserted through openings in each of said separators and of the same thickness as said separators and formed of acid resisting and insulating material for permanently keeping the adjacent plates separated.

In witness whereof, we have hereunto affixed our signatures in the presence of the witnesses herein named.

IRA C. WILLIAMS.
CHARLES F. WILLIAMS.

Witnesses:
JOSEPH T. DAY,
CHARLES B. SMITH.